United States Patent
Tao et al.

(10) Patent No.: US 10,928,820 B1
(45) Date of Patent: Feb. 23, 2021

(54) CONFIDENCE LEVELS ALONG THE SAME PREDICTED TRAJECTORY OF AN OBSTACLE

(71) Applicant: Baidu USA LLC, Sunnyvale, CA (US)

(72) Inventors: Jiaming Tao, Sunnyvale, CA (US);
Kecheng Xu, Sunnyvale, CA (US);
Jiaxuan Xu, Sunnyvale, CA (US);
Hongyi Sun, Sunnyvale, CA (US);
Jiacheng Pan, Sunnyvale, CA (US);
Jinyun Zhou, Sunnyvale, CA (US);
Yifei Jiang, Sunnyvale, CA (US);
Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/681,402

(22) Filed: Nov. 12, 2019

(51) Int. Cl.
*G05D 1/00* (2006.01)
*G05D 1/02* (2020.01)
*B60W 30/095* (2012.01)

(52) U.S. Cl.
CPC ....... *G05D 1/0088* (2013.01); *B60W 30/0956* (2013.01); *G05D 1/0214* (2013.01); *G05D 1/0274* (2013.01); *B60W 2554/00* (2020.02); *G05D 2201/0213* (2013.01)

(58) Field of Classification Search
CPC . G05D 1/0088; G05D 1/021; B60W 30/0956; B60W 30/095
See application file for complete search history.

(56) References Cited

U.S. PATENT DOCUMENTS

| | | | |
|---|---|---|---|
| 2017/0132334 A1* | 5/2017 | Levinson | G06F 30/20 |
| 2017/0210378 A1* | 7/2017 | Gunaratne | B60W 30/0953 |
| 2018/0329411 A1* | 11/2018 | Levinson | G06Q 10/06 |
| 2019/0049970 A1* | 2/2019 | Djuric | B60W 30/00 |
| 2019/0138007 A1* | 5/2019 | Baghsorkhi | G05D 1/0278 |

* cited by examiner

*Primary Examiner* — Hongmin Fan
(74) *Attorney, Agent, or Firm* — Womble Bond Dickinson (US) LLP

(57) ABSTRACT

In one embodiment, a process is performed during controlling Autonomous Driving Vehicle (ADV). A plurality of point confidence scores are determined, each defining a reliability of a corresponding point on a trajectory of a moving obstacle. At least one of the point confidence scores is determined based on a) an overall trajectory confidence score, and b) at least one environmental factor of the obstacle. The ADV is controlled based on the trajectory of the moving obstacle and at least one of the plurality of point confidence scores.

17 Claims, 9 Drawing Sheets

CONFIDENCE LEVELS ALONG THE SAME PREDICTED TRAJECTORY OF AN OBSTACLE

TECHNICAL FIELD

Embodiments of the present disclosure relate generally to operating autonomous vehicles. More particularly, embodiments of the disclosure relate to predicting a trajectory of a moving obstacle and determining confidence levels at multiple points along the trajectory.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Planning decisions made by autonomous driving vehicles (ADVs) can be based on map data and traffic rules. Moving obstacles such as other vehicles, cyclists, and pedestrians, can alter a route of an ADV. A trajectory of such moving obstacles can be predicted to help adjust a route of an ADV. Because the trajectory is a prediction of how the obstacle will move, it is not certain that the obstacle's actual path will match that of the prediction. Thus, planning decisions can be made based on how confident the ADV is in the prediction.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a process can determine multiple confidence scores along a single predicted trajectory of a moving obstacle. A confidence score represents a confidence level at which certain data is considered certain. Such a process can include determining a current status confidence level associated with a current status of a moving obstacle, the current status of the moving obstacle including one or more of speed, location, heading, acceleration, or a type of the moving obstacle. A trajectory is generated that predicts a path of the moving obstacle. The trajectory can be generated based on the current status of the moving obstacle, map data, and traffic rules. A single trajectory confidence score is generated and associated with the trajectory of the moving obstacle. The trajectory confidence score is determined based on the current status confidence score and the current status of the moving obstacle. The trajectory confidence score defines the overall confidence level of the trajectory. A plurality of point confidence scores are determined, each defining a reliability of a corresponding point on the trajectory. At least one of the point confidence scores are determined based on a) the trajectory confidence score and b) at least one environmental factor of the obstacle. The ADV is controlled based on the trajectory of the moving obstacle and at least one of the plurality of point confidence scores. For example, the ADV can alter a route based on the point confidence scores of the trajectory. Where the point confidence scores are low, the ADV can choose not to alter the route, but where point confidence scores are high, then the ADV can alter the route to prevent possible negative interactions (such as a collision) with the obstacle.

Figure 1:
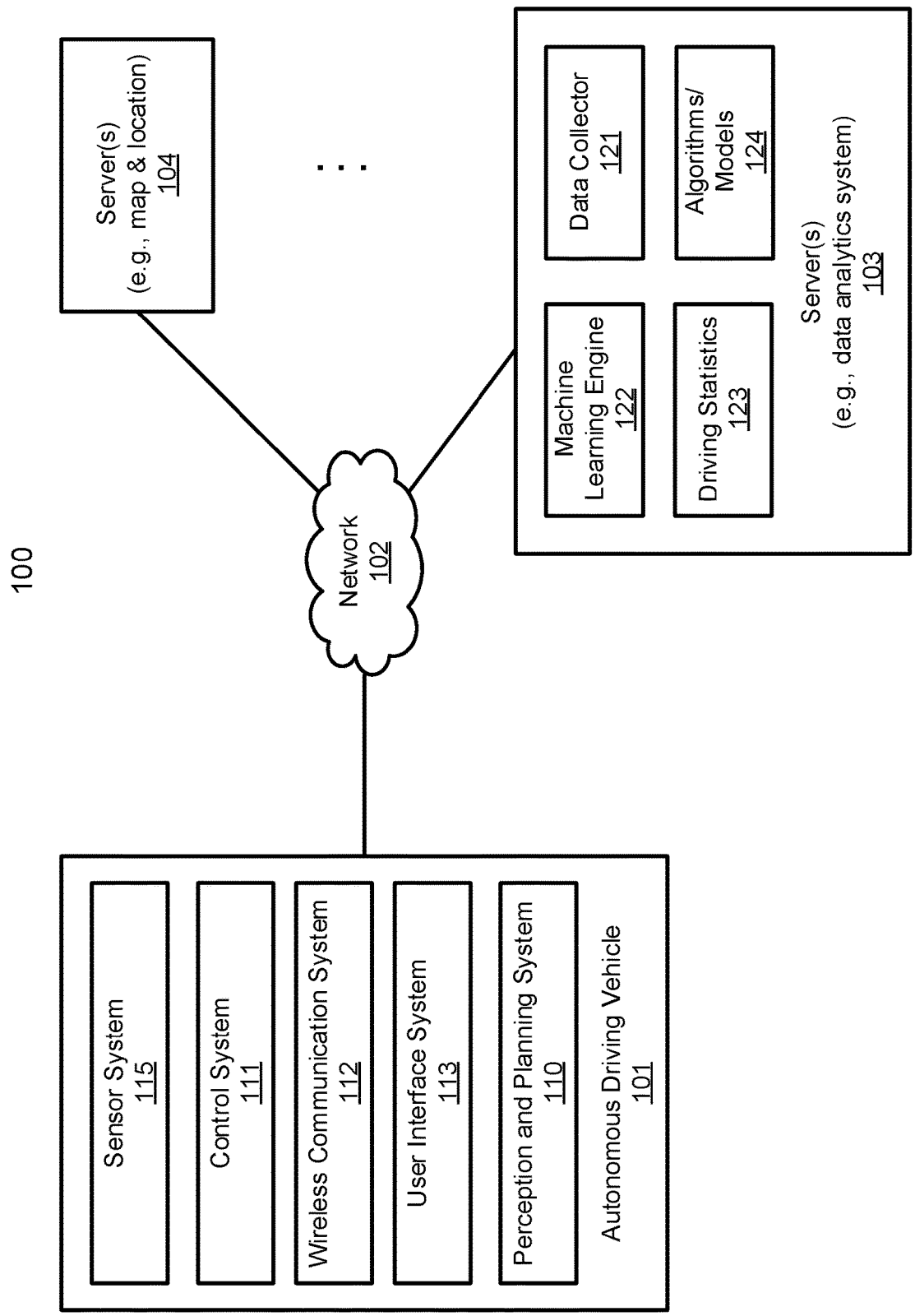
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
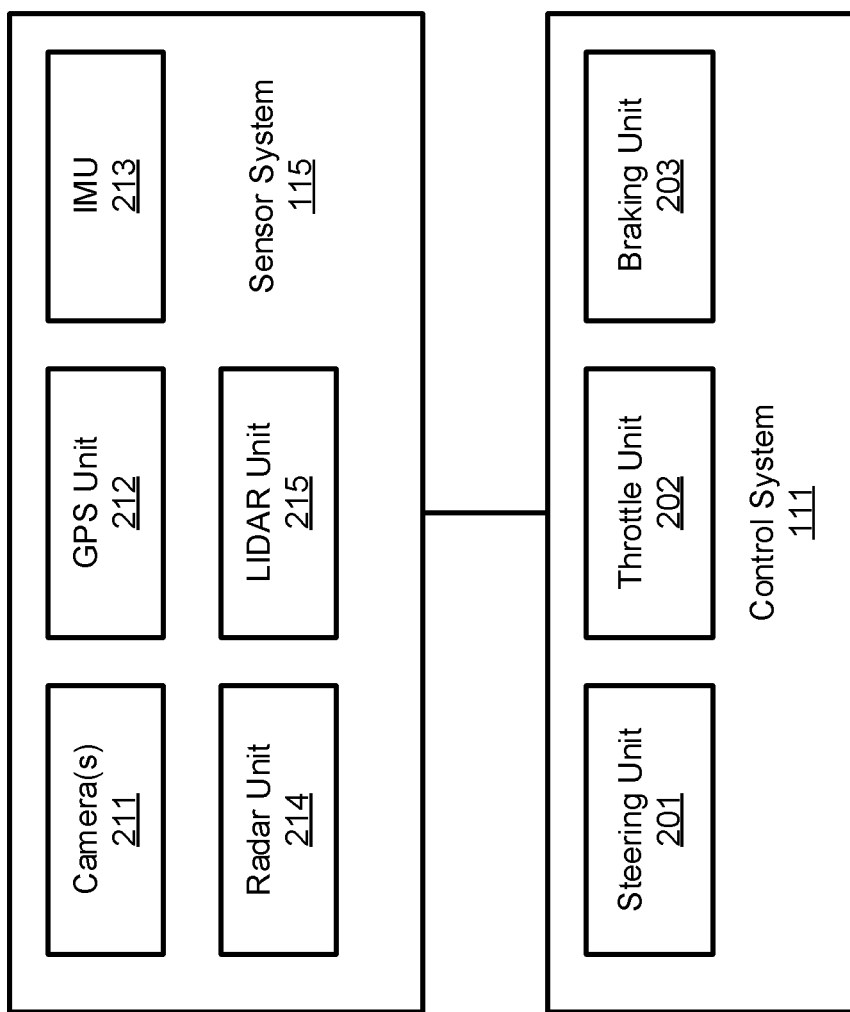
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include algorithms or functions to calculate the confidence scores for the current status of an obstacle, a trajectory predicted for the obstacle, and trajectory points of the trajectory, which will be described further below. Algorithms 124 can then be uploaded on ADVs to be utilized during autonomous driving in real-time.

Figure 3A:
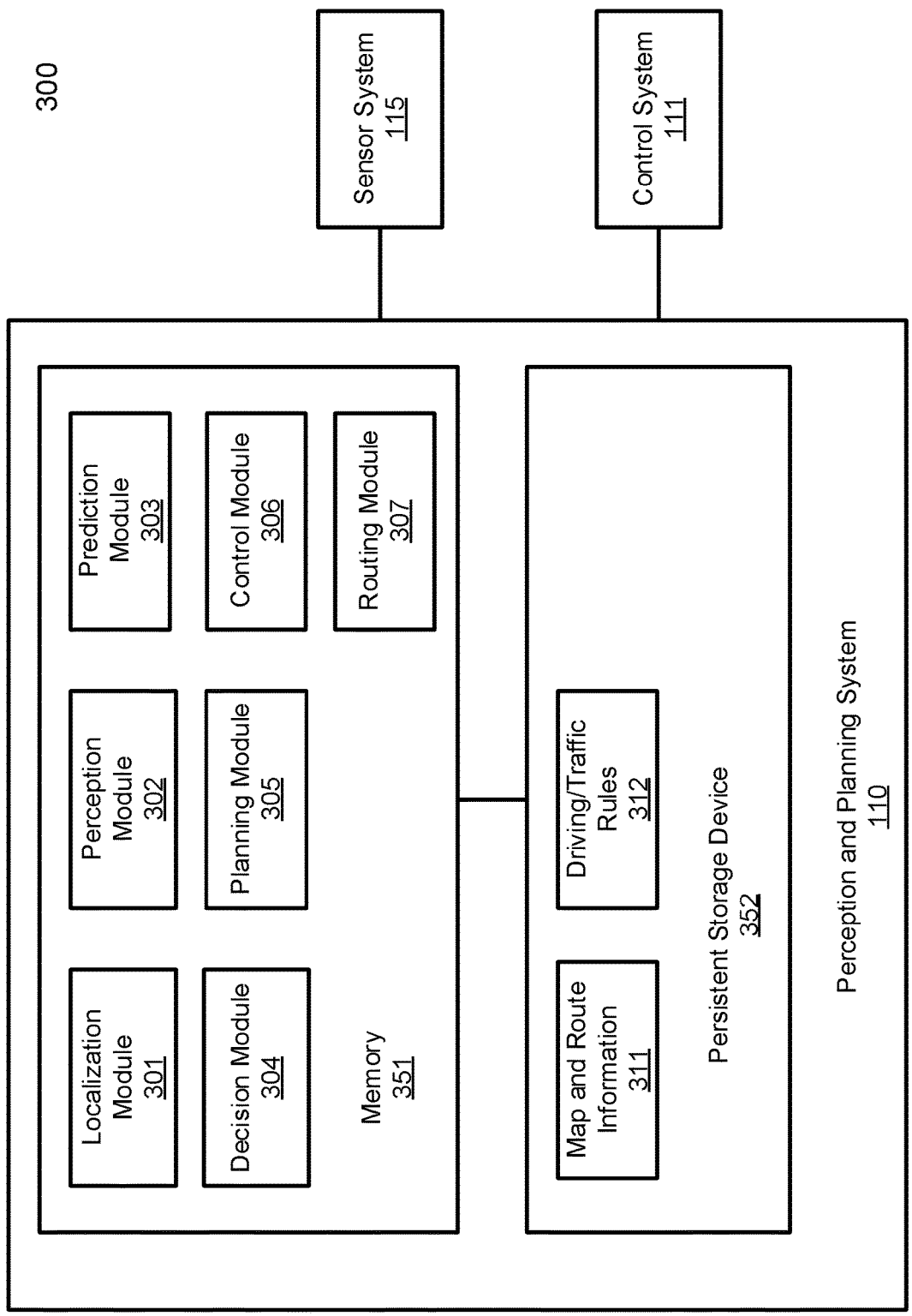
FIGS. 3A-3B are block diagrams illustrating an example of a perception and planning system used with an autonomous vehicle according to one embodiment.
Figure 3B:
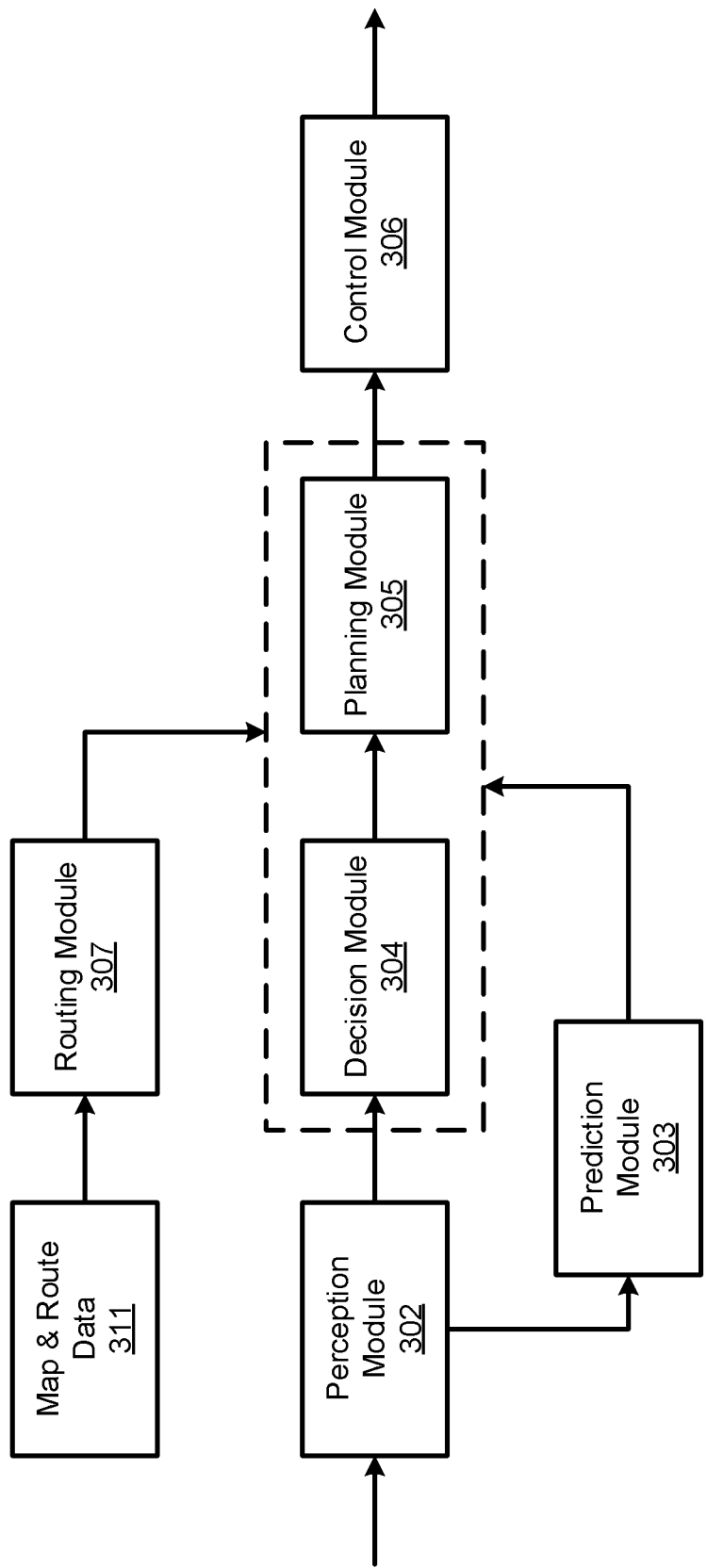

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or other obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

In some aspects, prediction module generates a predicted trajectory of an obstacle, for example, a vehicle other than the ADV, a pedestrian, or a cyclist, that predicts a path of the moving obstacle, at least in an area that is deemed relevant to a current path of the ADV. The predicted trajectory can be generated based the current status of the moving obstacle (e.g., speed, location, heading, acceleration, or a type of the moving obstacle), map data, and traffic rules.

For example, the ADV may recognize the obstacle as a vehicle that is sensed to be traveling in a driving lane on a map based on the obstacle's heading and location as well as reference to map data that contains lane location and orientation that corroborates that the obstacle, based on the heading and location of the obstacle, appears to be driving in the driving lane. Suppose that the map data indicates that this is a right turn only lane. Based on traffic rules (e.g., an obstacle of type 'vehicle' in a right turn only lane must turn right), a trajectory can be generated that includes coordinates and/or a mathematical representation of a line that predicts the obstacle's movement.

In some embodiments, when predicting a movement trajectory of an obstacle, a prediction system or module divides the trajectory prediction of an obstacle into two parts: 1) a longitudinal movement trajectory generation and 2) a lateral movement trajectory generation. These parts can be combined to form the predicted trajectory of the obstacle.

In some embodiments, the lateral movement trajectory (also simply referred to as a lateral trajectory) is generated including optimizing the trajectory using a first polynomial function. The longitudinal movement trajectory (also simply referred to as a longitudinal trajectory) is generated including optimizing the trajectory using a second polynomial function. The optimizations are performed based on current states of the obstacle as initial states and predicted end states of the obstacle as a set of constraints, such that the trajectories are smoothly aligned with at least a current heading direction of the obstacle. The end states are determined in view of the shape of a lane which the obstacle is predicted to move onto. Once the longitudinal movement trajectory and the lateral movement trajectory have been defined and generated, a final predicted trajectory for the obstacle can be determined by combining the longitudinal movement trajectory and the lateral movement trajectory. As a result, the predicted trajectory of the obstacle is more accurate based on the current states of the obstacle and the shape of the lane.

According to some aspects, an obstacle is predicted to move from a starting point to an end point based on perception data perceiving a driving environment surrounding an ADV that is driving within a lane. A longitudinal movement trajectory from the starting point to the end point is generated in view of a shape of the lane. A lateral movement trajectory from the starting point to the end point is generated, including optimizing a shape of the lateral movement trajectory using a first polynomial function. The longitudinal movement trajectory and the lateral movement trajectory are then combined to form a final predicted trajectory that predicts how the obstacle is to move. A path is generated to control the ADV to move in view of the predicted trajectory of the obstacle, for example, to avoid the collision with the obstacle.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

A polynomial optimization or polynomial fit refers to the optimization of the shape of a curve (for example, a trajectory of an obstacle) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point is divided into a number of segments (or pieces) each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

Figure 4:
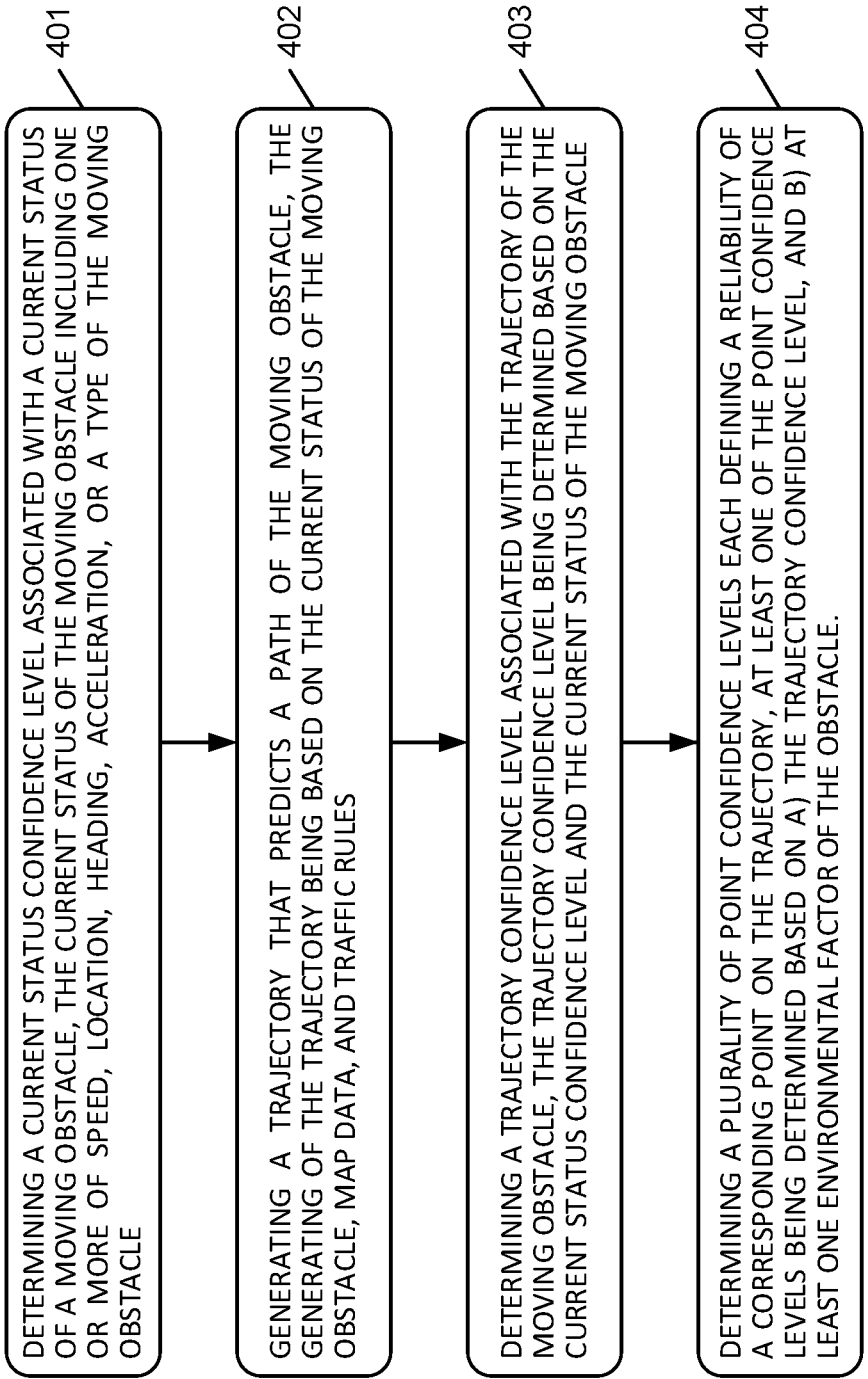
FIG. 4 shows a process for generating point confidence scores according to one embodiment.

Referring to FIG. 4, a process 400 is shown that can be performed for an Autonomous Driving Vehicle (ADV) during driving. As a result of the process, a trajectory of a moving obstacle is generated having a plurality of confidence levels along different points of the trajectory.

At block 401, the process includes determining a current status confidence score (also referred to as confidence level) associated with a current status of a moving obstacle, the current status of the moving obstacle including one or more of speed, location, heading, acceleration, or a type of the moving obstacle. The current status confidence score can be a value representing how confident the ADV is in the current status of the vehicle. Confidence scores can also be interpreted as representing a probability that the moving obstacle will take a particular path or move to a particular location.

In some embodiments, the current status confidence score can be a percentage. If confidence in the current status is low, due to factors discussed in other sections, then the level can be set to 20%. If confidence is high, also due to the factors, then the level can be set to 99%. The current status and the confidence associated with the current status can change from one frame to the next, as the different factors change (e.g., sensing to the obstacle becomes less obstructed). In some embodiments, the current status includes all of the speed, the location, the heading, the acceleration, and the type of the moving obstacle.

At block 402, the process includes generating a trajectory that predicts a path of the moving obstacle, the generating of the trajectory being based on the current status of the moving obstacle, map data, and traffic rules. As described in other sections, the trajectory of the obstacle can be formed from coordinates and/or a mathematical representation of a line. This can involve combining a lateral movement trajectory with a longitudinal movement trajectory of the obstacle. The lateral and longitudinal movement trajectories can be optimized prior to combining, using polynomial optimization. The current status of the moving obstacle (e.g., heading, speed, location, acceleration) can be used as restraints to optimize the respective polynomial functions. The polynomial functions can represent predicted trajectories that are formed based on the map data and traffic rules. For example, if current status defines the obstacle as a vehicle type that is headed down a driving lane, and the driving lane is straight without any turns (based on map data), then traffic rules can be referenced to indicate that the trajectory of the vehicle will be straight down the driving lane.

At block 403, the process includes determining a trajectory confidence score associated with the trajectory of the moving obstacle, the trajectory confidence score being determined based on the current status confidence score and the current status of the moving obstacle. Based on certain factors, a single trajectory confidence score can be determined for an entire trajectory. This can be described as a global trajectory confidence score, and can be used in the next block to determine point confidence scores of the trajectory. Factors that influence the global confidence score of a trajectory are further discussed in other sections.

At block 404, the process includes determining a plurality of point confidence scores each defining a reliability of a corresponding point on the trajectory, at least one of the point confidence scores being determined based on a) the trajectory confidence score and b) at least one environmental factor of the obstacle. The ADV is controlled based on the trajectory of the moving obstacle and at least one of the plurality of point confidence scores. For example, based on the obstacle's trajectory, planning can adjust a path of the ADV to avoid the obstacle's predicted path. In some situations, planning of the ADV may determine whether to yield, stop, or overtake the obstacle. In some situations, the ADV can determine whether or not to adjust the ADV's path based on whether the confidence score of the obstacle satisfies some threshold criteria. For example, if the confidence score is below 5%, then the ADV can maintain the current path. The ADV's control module can issue steering, acceleration and braking commands to the ADV's control system to move the ADV accordingly. Environmental factors influencing each point confidence score can include any combination of a) a distance between a respective point and a starting location of the moving obstacle, b) the traffic rules, c) the map data, or d) type of the moving obstacle (e.g., a vehicle, pedestrian, or cyclist).

Such a process can help an ADV adjust a route and, consequently, other vehicle controls such as steering, braking, and/or acceleration, due to predicted trajectories and confidence scores of an object. The confidence scores along the different points can vary so that the ADV can plan the route and controls based on how confident the ADV is in the predicted trajectory at a particular point. This provides finer control and decision making, as opposed to making driving decisions based solely on an overall confidence score of the trajectory. In some embodiments, at least one of the point confidence scores is determined based on a predicted interaction between a) an object in an environment of the ADV, the traffic rules, or the map data, and b) the moving obstacle at the corresponding point on the trajectory. This is further described in other sections.

Figure 5:
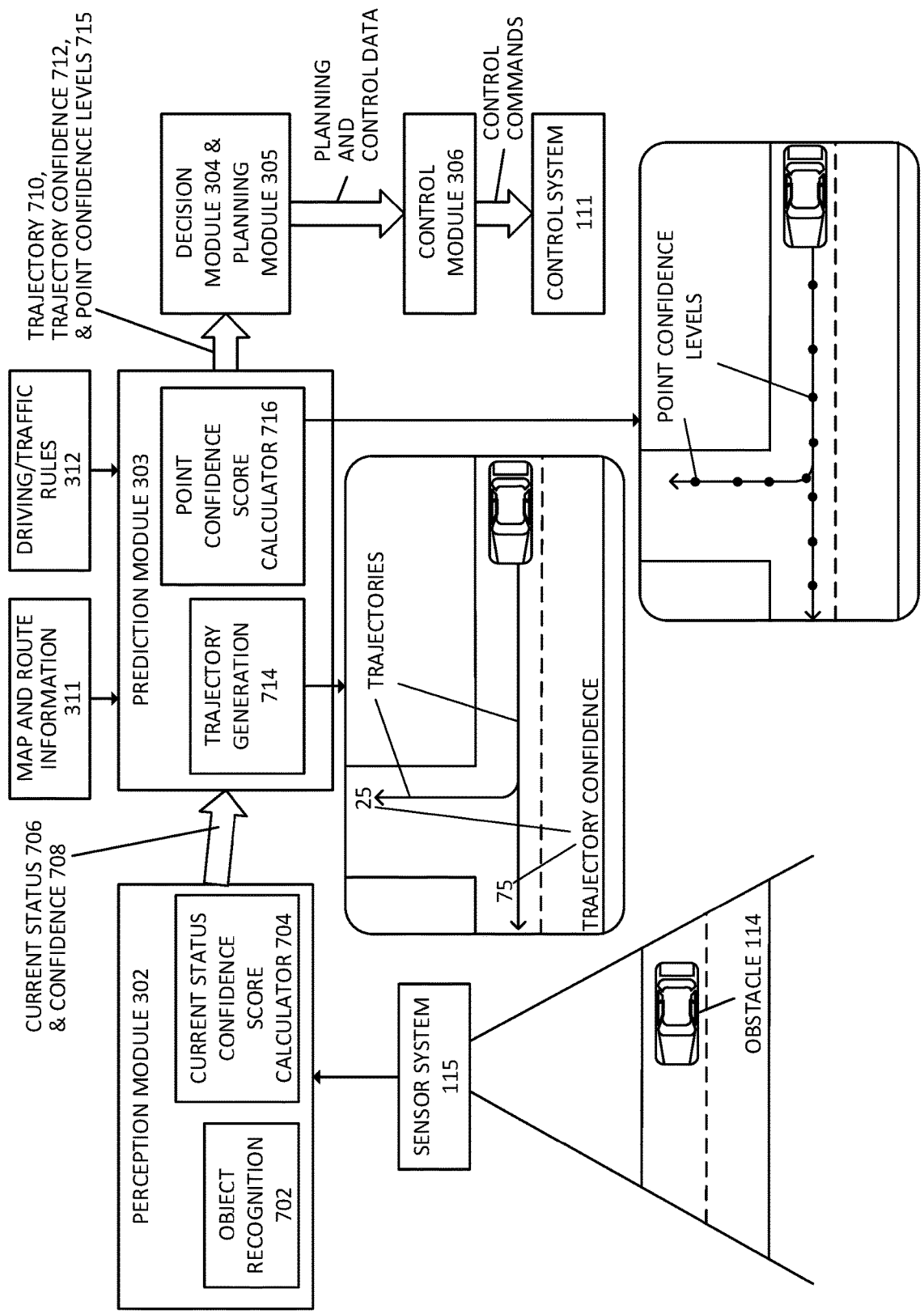
FIG. 5 shows a block diagram illustrating a process for generating point confidence scores according to one embodiment.

Referring to FIG. 5, a flow diagram is shown that further elaborates on the features of the process 400 shown in FIG. 4. At perception module 302, an obstacle, such as vehicle 114 is sensed by sensor system 115. A current status, including the speed, location, heading, acceleration, and/or a type of the moving obstacle (in this case a vehicle 114) is generated based on the sensed data. A confidence score associated with the current status can be determined based on numerous factors. In some embodiments, the confidence score of the current status is determined based on a distance between the ADV and the moving obstacle. The further away the moving obstacle is, the less confidence can be given to sensing of the moving obstacle. Thus, although sensors of sensor system 115 might appear to sense the obstacle, when the obstacle is relatively far away (e.g., 30-50 meters), a distance factor may reduce the confidence score of the current status. As the distance between the obstacle and the ADV shrinks, the confidence score can increase because the sensors are closer to the obstacle and, as a result, the sensed data is presumably more reliable.

In some embodiments, the current status confidence score is determined based further on an object recognition accuracy. For example, an object recognition block 702 can utilize computer vision and machine learning algorithms such as a trained neural network that has been trained with data sets to recognize sensed obstacles. For example, images sensed by the sensor system 115 can be processed at object recognition block 702 to recognize moving obstacles in the images such as a vehicle (car, motorcycle, truck, etc.), a pedestrian, or a cyclist. Object recognition, however, is not perfect. Depending on the clarity of the images, or how recognizable a shape is of the obstacle based on past training data sets, the object recognition block 702 can determine a score of how confident or reliable the recognition of an object is in those images. The score can help determine whether the recognition of the object is true or a false positive. Neural network APIs (e.g., Tensorflow Object Detection API) can be leveraged to provide various reliability metrics (e.g., PASCAL VOC 2010 detection metric, Weighted PASCAL VOC detection metric, PASCAL VOC 2010 instance segmentation metric, COCO detection metrics, COCO mask metrics, Open Images V2 detection metric, etc.) that indicate confidence of the object recognition.

In some embodiments, the current status confidence score is determined based on whether a line of sight between one or more sensors of the ADV and the moving obstacle is at least partially blocked. Blockage of a moving obstacle can influence object recognition metrics. Additionally or alternatively to the metrics, the object recognition block 702 can add a penalty to the current status confidence score if the moving obstacle is at least partially blocked. The penalty can be increased or decreased depending on the amount of blockage (e.g., the greater the blockage, the higher the penalty). Thus, as blockage increases, the confidence score of the current status is reduced, and conversely, as blockage is reduced, the confidence score of the current status increases.

It should be understood that, throughout the present disclosure, factors can increase or decrease confidence scores of the current status, the obstacle trajectory, or points along the obstacle trajectory. The factors can be applied through arithmetic, e.g., addition, subtraction, multiplication, and/or division.

In some aspects, the current status confidence score is determined based further on the type of the moving obstacle, e.g., a vehicle, a pedestrian, or a cyclist. Sensing of current status information can be deemed more reliable based on different types of obstacles. For example, sensor information sensing a heading, speed, and location of the vehicle may be deemed more accurate than sensor information that senses heading, speed, and location of a pedestrian or cyclist due to their size, detectable surfaces, and speed differences. The ADV may require multiple frames to determine heading, speed, and/or acceleration. A vehicle may tend to have more constant heading, speed, and acceleration from one frame to the next, thus making the heading information more reliable than that of a pedestrian.

At block 704 a single current status confidence score can be determined based on one or more of the discussed factors (e.g., obstacle type, obstructions, and/or machine learning object recognition accuracy) and associated with the current status of the obstacle. As mentioned, the current status and the associated confidence score can change frame-by-frame, for example, as the obstacle gets closer or farther from the ADV, or becomes more or less obstructed. The current status 706 and associated current status confidence score 708 can be provided to prediction module 303.

Trajectory generation block 714 generates a trajectory based on map data from map and route information 311. Traffic rules 312 can be referenced to predict how the obstacle will move, with respect to the map data. For example, if the obstacle is a vehicle then one or more trajectories can be determined for the vehicle. As shown in the example in FIG. 5, map data might indicate an intersection ahead of the detected vehicle. Traffic rules can indicate that, in the vehicle's detected lane, the vehicle is allowed to travel straight or make a right turn. Thus, trajectories 710 can be generated to predict movement of the vehicle along those trajectories. A confidence score 712 can be generated and associated with each trajectory of the vehicle. This confidence score can describe a confidence that the ADV system has in taking the corresponding trajectory. In another example, if the obstacle is a pedestrian that is detected to be walking along a sidewalk, map data specifies where the sidewalk will end. Numerous trajectories of the pedestrian can be determined based on referencing the traffic rules, for example, a first trajectory can be generated so that the pedestrian is predicted to move across the sidewalk in a first direction, a second trajectory can be determined where the pedestrian moves across the sidewalk in a second direction, and a third trajectory can be determined where the pedestrian rounds the corner of the sidewalk and continues to walk on the sidewalk.

In some embodiments, a single trajectory confidence score is associated with each trajectory. The trajectory confidence score can be determined based on the current status confidence score and the current status of the obstacle. For example, if the confidence score of the current status is 80%, this can carry over as a baseline trajectory confidence score. Confidence based on data in the current status such as speed, heading, acceleration, and type can be added to this baseline, but this confidence is determined relative to the trajectory. For example, referring to the vehicle 114 shown in FIG. 5, if the speed of the vehicle is high, and/or no deceleration is detected, then this may indicate that the vehicle intends to move straight rather than turn right. In such a case, the confidence score associated with the straight trajectory may be higher than the confidence score associated with the right turning trajectory. As indicated, in some embodiments, the trajectory confidence score is determined based on the map data (e.g., knowing where the sidewalks, intersections, roads, and/or lanes are) and the traffic rules (knowing what is allowed of each obstacle type on the given road, or intersection, which may indicate how the obstacle intends to move).

In some embodiments, the trajectory confidence score is determined based further on machine learning. For example, neural networks can be trained based on a plurality of training data indicating different situations such as vehicles, pedestrians, and/or cyclists approaching intersections at given headings, speeds, and accelerations. Other training data can indicate when an obstacle may be changing lanes or changing direction based on variations in heading, speed, and/or acceleration. Based on these trained neural networks, the heading information of the obstacle can be processed at block 714 to determine the confidence score 712 of the obstacle's trajectory. It should be understood that multiple obstacles can be processed concurrently. One or more trajectories are generated for each obstacle, each trajectory representing a predicted path that the obstacle might take.

At block 716, point confidence scores are determined. Point confidence scores 715 are confidence scores that vary at different corresponding points of an obstacle's trajectory 712. The points can be spaced at different intervals (e.g., every 1, 5, 10, 20 meters) depending on application, obstacle type, speed of obstacle, length of trajectory, and capable of being determined through routine test and experimentation. Each point confidence score of a trajectory can be determined based on a) using the trajectory confidence score of the trajectory as a baseline, and b) one or more environmental factors.

Figure 6:
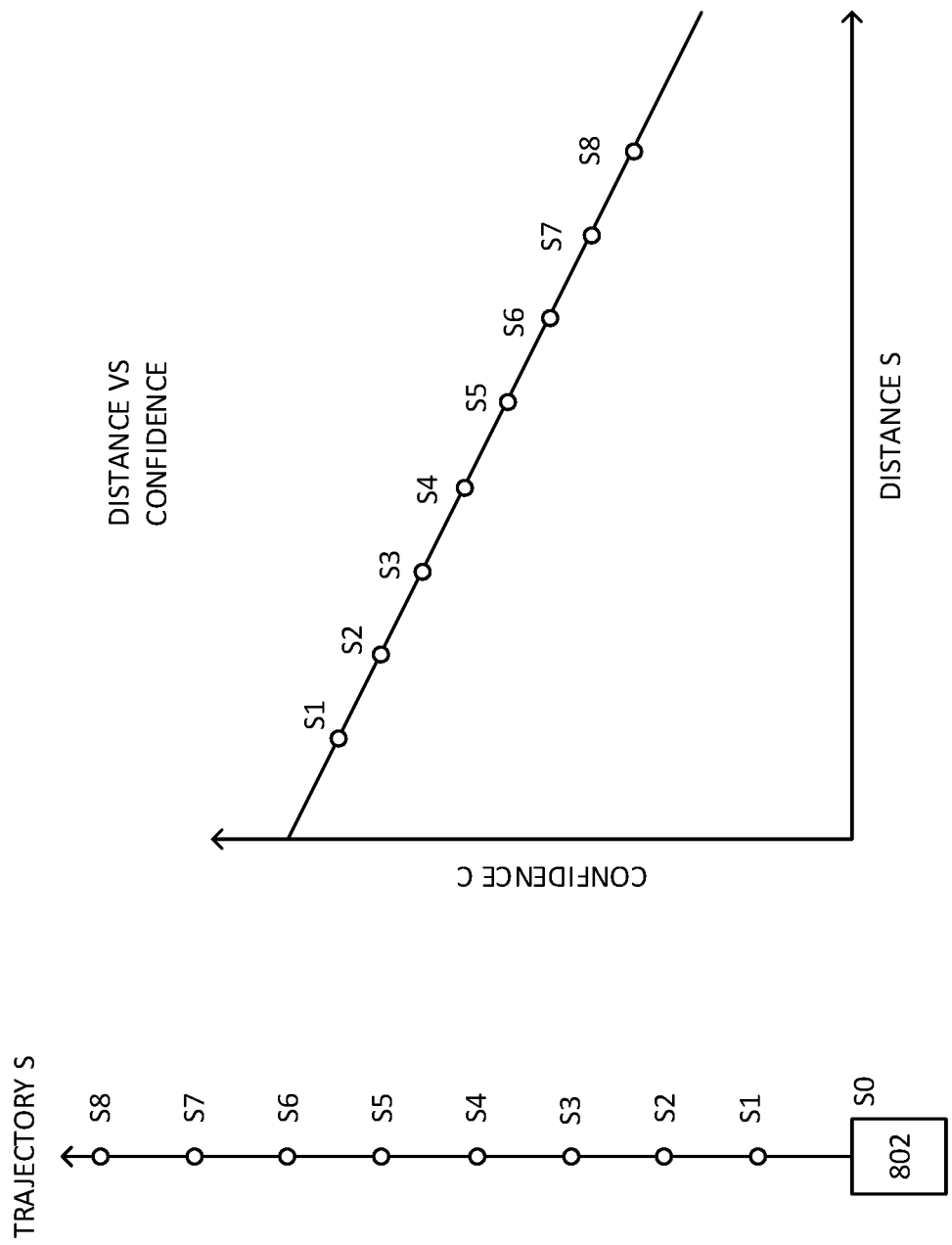
FIGS. 6-8 show environmental factors around the trajectory that influence the point confidence scores, according to some embodiments.

In some embodiments, at least one environmental factor includes one or more of a) a distance between a respective point and a starting location of the moving obstacle, b) the traffic rules, or c) the map data. For example, referring to FIG. 6, a trajectory S is generated for an obstacle 802 (e.g., a vehicle, a pedestrian, or a cyclist). Point confidence scores at corresponding points S1-S8 can be determined as a function of distance from the current location of the obstacle (which can be specified in the obstacle's current status) to a distance farther along the trajectory. As the distance along the trajectory from the current location increases, the confidence C at each point S1-S8 decreases. Although the slope is shown as straight, it should be understood that the slope can be straight or curved, and may vary from one obstacle type to the next. For example, confidence of a pedestrian may vary greater (e.g., decrease faster) with respect to distance in comparison with a vehicle, given that pedestrians may be more likely to wander off a sidewalk or into a store, as opposed to a vehicle, which tends to be constrained by roads. Appropriate slope values can be determined based on routine test and repetition. In some cases, the relationship of confidence and distance can be non-linear.

In some embodiments, at least one of the point confidence scores is determined based on a predicted interaction between a) an object in an environment of the ADV, the traffic rules, or the map data, and b) the moving obstacle at the corresponding point on the trajectory. For example, if an object such as a trash can is sensed in the middle of a road, then a confidence score at a point of a trajectory of a vehicle driving along that road can be lowered near the trash can, because it is uncertain how the vehicle might move to avoid the trash can.

Figure 7:
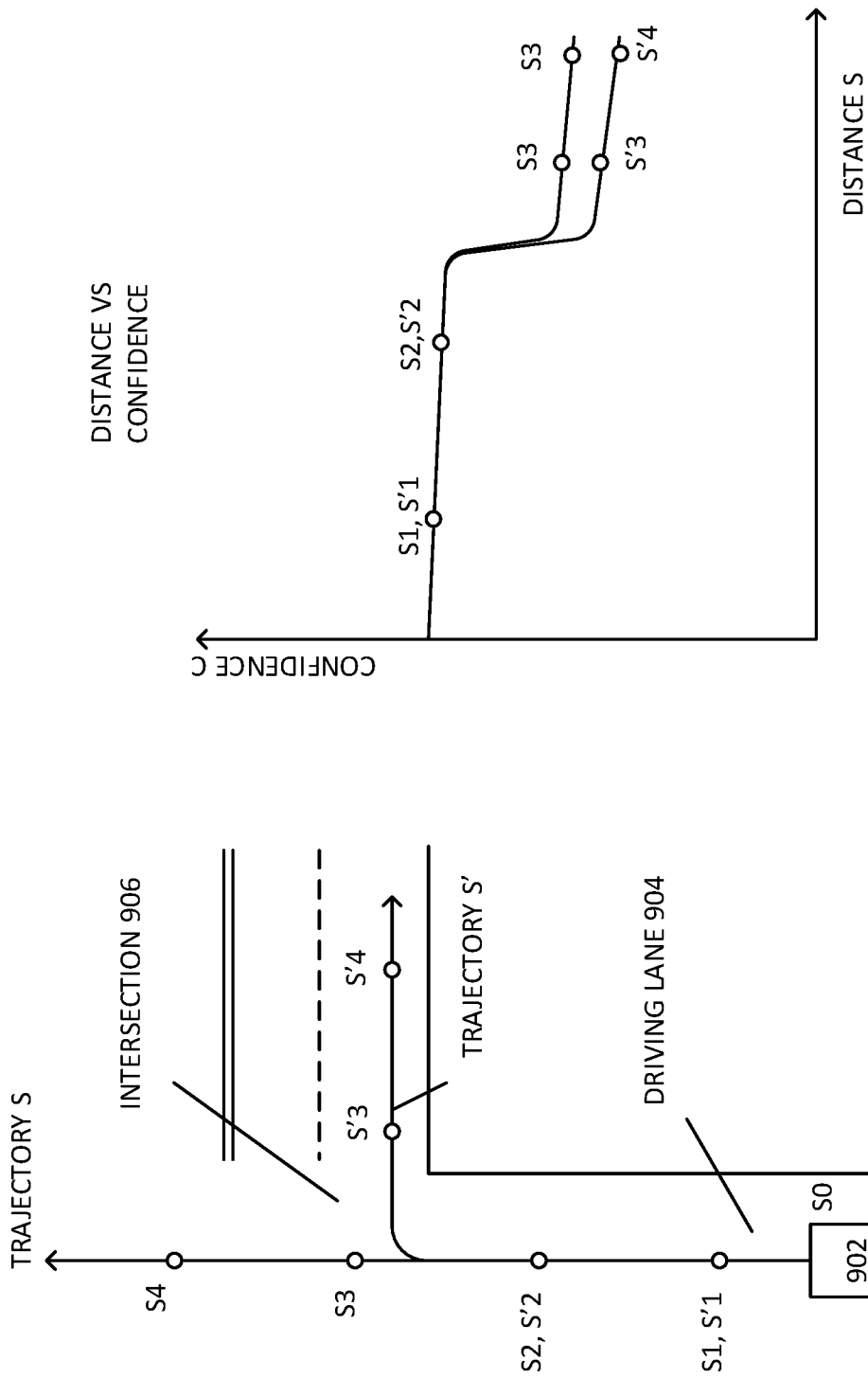

In another example, as shown in FIG. 7, confidence scores at different points of trajectory can be determined based on map data and traffic rules. Map data can indicate that an obstacle 902 such as a vehicle is located at and heading up a driving lane 904. Map data can indicate that an intersection 906 is located ahead of the obstacle. Traffic rules can indicate that vehicles driving in that driving lane are allowed to continue to drive straight or turn right at the intersection. A first trajectory S can be generated to represent the straight trajectory, while a second trajectory S' can be generated to represent the right turn trajectory. Point confidence scores at points S1-S4 can be determined for trajectory S. Similarly, point confidence scores at points S' 1-S'4 can be determined for trajectory S'. In this example, confidence scores at S1 and S' 1 and S2 and S'2 match, since S and S' share the same trajectory at those points. Point confidence scores at points S3 and S4 drop after the intersection (compared with confidence at points S1 and S2) because there is uncertainty as to whether the vehicle will turn or go straight. Similarly, confidence scores at points S'3 and S'4 drop after the intersection (compared with confidence at points S' 1 and S'2) because of the same uncertainty.

In one embodiment, the points S'3 and S'4 have lower point confidence scores than S3 and S4 based on current status of the obstacle. For example, speed, heading, and/or acceleration of vehicle 902 may indicate that the vehicle intends to continue straight. If the vehicle speed is maintained as above a threshold, maintains heading, and/or does not decelerate, this can indicate that the vehicle does not intend to slow down for a turn. In such a case, S3 and S4 can have a higher confidence than S'3 and S'4. On the other hand, if the vehicle decelerates, has a speed below a turning threshold, or changes heading changes, this can indicate that the vehicle intends to turn right. In such a case, S'3 and S'4 could have a higher point confidence score than S3 and S4. In both cases, however, the points after the intersection have lower confidence scores than the points prior to the intersection. This is because the intersection manifests uncertainty in the trajectory of the obstacle.

In some aspects, the environmental factor includes a type of the moving obstacle (e.g., whether the obstacle is a vehicle, a pedestrian, or a cyclist). The type of the moving obstacle can be referenced against map data and traffic rules to judge confidence scores at different points of the trajectory. For example, as discussed, point confidence scores as a function of distance of a pedestrian's trajectory may lower more dramatically than that of a vehicle's trajectory because pedestrians can walk into stores, houses, drop off trash at a trashcan, chase after a friend, etc. In contrast, a vehicle may be more bound to road rules (e.g., right turn only, straight only, etc.).

In some embodiments, the object that potentially interferes with an obstacle can be another obstacle such as a pedestrian, vehicle, or cyclist. As two obstacle's predicted trajectories get closer to each other, confidence scores at points along the trajectories where they come close or potentially intersect will be reduced, due to uncertainty as to how the obstacles will interfere with each other.

Figure 8:
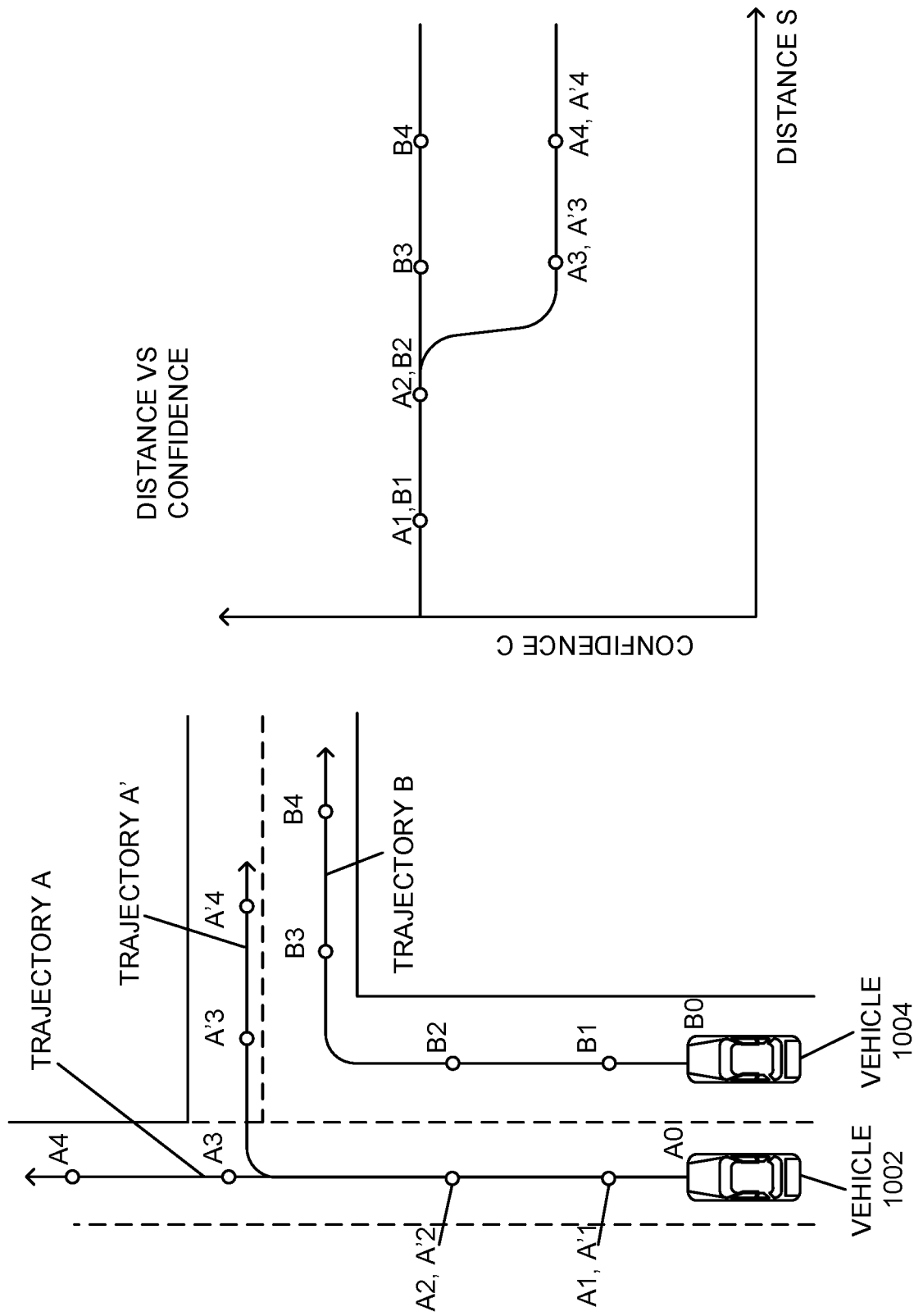

In another example, as shown in FIG. 8, trajectories A and A' can be generated for vehicle 1002, and a trajectory B can be determined for vehicle 1004. According to map data and traffic rules, vehicle 1002 can either remain straight or turn right. Trajectory A and A' can have points A1 and A2 that share a first confidence score. After the intersection, points A3, A'3, A4 and A'4 have a reduced confidence score, due to uncertainty as to whether vehicle 1002 will turn right or remain straight. In contrast, trajectory B remains constant because vehicle 1002 is headed down a road that is right turn only. Thus, points B1-B4 can have the same confidence score because the traffic rules that are relevant to trajectory B do not create ambiguity at the intersection.

Further, in the embodiments shown in FIG. 8, distance from starting point is not taken into account, as shown by the flat slope of point confidence scores of trajectory B. In contrast, distance from starting point is factored into the point confidence scores shown in FIG. 7, as shown by the slight downward slope of point confidence scores of trajectories S and S'.

It should be understood that the moving obstacle can include other moving objects other than a vehicle, a pedestrian, or a cyclist. Further, examples discussed in FIGS. 8-10 are meant to be illustrative rather than limiting. Numerous relationships exist between map data, traffic rules, and obstacle type that can influence point confidence scores of a predicted trajectory of an obstacle. However, based on the features discussed in the present disclosure, point confidence scores along a predicted trajectory can be increased or reduced based on particular map details, particular traffic rules, a particular obstacle type, and other detected objects within a proximity of the obstacle (e.g., within 0-30 meters) that might influence the obstacle's trajectory. Further, graphs illustrated in FIGS. 8-10 are shown to illustrate concepts described herein rather than to show exact values of confidence scores.

Referring to FIG. 5, decision module 304 and planning module 305 can adjust a route of the ADV based on the obstacle's trajectory and one or more point confidence scores of the trajectory, resulting in planning and control data. In some embodiments, the route is only adjusted if a point confidence score of a trajectory satisfies a threshold (e.g., 5%, 10%, 25%, etc.). Control module 306 uses the planning and control data to generate control commands such as steering and acceleration. These control commands are used by the control system 111 to move the ADV along the adjusted route.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method performed for an autonomous driving vehicle (ADV), the method comprising:
   determining a current status confidence score representing a confidence level concerning an accuracy of a current status of a moving obstacle, the current status of the moving obstacle including one or more of speed, location, heading, acceleration, or a type of the moving obstacle;
   generating a trajectory that predicts a path of the moving obstacle based on the current status of the moving obstacle, map data, and traffic rules;
   determining a trajectory confidence score representing a confidence level of a trajectory that the moving obstacle likely moves based on the current status confidence score and the current status of the moving obstacle;
   determining a plurality of point confidence scores each defining a reliability of a corresponding point on the trajectory based on the trajectory confidence score and at least one environmental fact of the moving obstacle, and
   planning a path to control and drive the ADV in view of the trajectory, the trajectory confidence score, and the point confidence scores of the trajectory.

2. The method of claim 1, wherein the at least one environmental factor includes one or more of a) a distance between a respective point and a starting location of the moving obstacle, b) the traffic rules, or c) the map data.

3. The method of claim 1, wherein the at least one environmental factor includes the type of the moving obstacle.

4. The method of claim 1, wherein at least one of the point confidence scores is determined based on a predicted interaction between an object in an environment of the ADV, the traffic rules, or the map data, and the moving obstacle at the corresponding point on the trajectory.

5. The method of claim 1, wherein the current status confidence score is determined based on a distance between the ADV and the moving obstacle.

6. The method of claim 1, wherein the current status confidence score is determined based on whether a line of sight between one or more sensors of the ADV and the moving obstacle is at least partially blocked.

7. The method of claim 1, wherein the trajectory confidence score is determined based further on the map data and the traffic rules.

8. A non-transitory machine-readable medium having instruction stored therein, which when executed by a processor, cause the processor to perform operations of operating an autonomous driving vehicle (ADV), the operations comprising:
 determining a current status confidence score representing a confidence level concerning an accuracy of a current status of a moving obstacle, the current status of the moving obstacle including one or more of speed, location, heading, acceleration, or a type of the moving obstacle;
 generating a trajectory that predicts a path of the moving obstacle based on the current status of the moving obstacle, map data, and traffic rules;
 determining a trajectory confidence score representing a confidence level of a trajectory that the moving obstacle likely moves based on the current status confidence score and the current status of the moving obstacle;
 determining a plurality of point confidence scores each defining a reliability of a corresponding point on the trajectory based on the trajectory confidence score and at least one environmental fact of the moving obstacle, and
 planning a path to control and drive the ADV in view of the trajectory, the trajectory confidence score, and the point confidence scores of the trajectory.

9. The machine-readable medium of claim 8, wherein the at least one environmental factor includes one or more of a) a distance between a respective point and a starting location of the moving obstacle, b) the traffic rules, or c) the map data.

10. The machine-readable medium of claim 8, wherein the at least one environmental factor includes the type of the moving obstacle.

11. The machine-readable medium of claim 8, wherein at least one of the point confidence scores is determined based on a predicted interaction between an object in an environment of the ADV, the traffic rules, or the map data, and the moving obstacle at the corresponding point on the trajectory.

12. The machine-readable medium of claim 8, wherein the current status confidence score is determined based on a distance between the ADV and the moving obstacle.

13. The machine-readable medium of claim 8, wherein the current status confidence score is determined based on whether a line of sight between one or more sensors of the ADV and the moving obstacle is at least partially blocked.

14. The machine-readable medium of claim 8, wherein the trajectory confidence score is determined based further on the map data and the traffic rules.

15. A data processing system, comprising:
 a processor; and
 a memory coupled to the processor to store instructions, which when executed by the processor, cause the processor to perform operations of operating an autonomous driving vehicle (ADV), the operations including
  determining a current status confidence score representing a confidence level concerning an accuracy of a current status of a moving obstacle, the current status of the moving obstacle including one or more of speed, location, heading, acceleration, or a type of the moving obstacle,
  generating a trajectory that predicts a path of the moving obstacle based on the current status of the moving obstacle, map data, and traffic rules,
  determining a trajectory confidence score representing a confidence level of a trajectory that the moving obstacle likely moves based on the current status confidence score and the current status of the moving obstacle,
  determining a plurality of point confidence scores each defining a reliability of a corresponding point on the trajectory based on the trajectory confidence score and at least one environmental fact of the moving obstacle, and
  planning a path to control and drive the ADV in view of the trajectory, the trajectory confidence score, and the point confidence scores of the trajectory.

16. The system of claim 15, wherein the at least one environmental factor includes one or more of a) a distance between a respective point and a starting location of the moving obstacle, b) the traffic rules, or c) the map data.

17. The system of claim 15, wherein the at least one environmental factor includes the type of the moving obstacle.

* * * * *